US010502577B2

(12) United States Patent
Lynch

(10) Patent No.: US 10,502,577 B2
(45) Date of Patent: Dec. 10, 2019

(54) ITERATIVE MAP LEARNING BASED ON VEHICLE ON-BOARD SENSOR DATA

(71) Applicant: HERE Global B.V., Eindhoven (NL)

(72) Inventor: James D. Lynch, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 423 days.

(21) Appl. No.: 15/198,671

(22) Filed: Jun. 30, 2016

(65) Prior Publication Data

US 2018/0003512 A1 Jan. 4, 2018

(51) Int. Cl.
G06F 16/23 (2019.01)
G05D 1/02 (2006.01)
G08G 1/09 (2006.01)
G01C 21/32 (2006.01)
G06K 9/00 (2006.01)
G08G 1/0967 (2006.01)
H04W 4/06 (2009.01)
H04W 4/44 (2018.01)

(52) U.S. Cl.
CPC ........... G01C 21/32 (2013.01); G05D 1/0274 (2013.01); G06F 16/2365 (2019.01); G06K 9/00791 (2013.01); G08G 1/09675 (2013.01); G08G 1/096716 (2013.01); G08G 1/096741 (2013.01); G08G 1/096775 (2013.01); H04W 4/06 (2013.01); H04W 4/44 (2018.02)

(58) Field of Classification Search
None
See application file for complete search history.

(56) References Cited

U.S. PATENT DOCUMENTS

| 6,047,234 | A | 4/2000 | Cherveny et al. |
| 6,253,151 | B1 | 6/2001 | Ohler et al. |
| 2008/0082260 | A1 | 4/2008 | Kimura |
| 2010/0131193 | A1 | 5/2010 | Shnyr |
| 2010/0332119 | A1 | 12/2010 | Geelen et al. |
| 2011/0238735 | A1 | 9/2011 | Gharpure et al. |
| 2011/0276263 | A1 | 11/2011 | Shimotani et al. |
| 2012/0323483 | A1 | 12/2012 | Mutoh |

(Continued)

OTHER PUBLICATIONS

International Searching Authority, International Search Report and Written Opinion for International Application No. PCT/EP2017/065769, dated Sep. 8, 2017, 15 pages, European Patent Office, Netherlands.

Primary Examiner — Kevin P Mahne
(74) Attorney, Agent, or Firm — Alston & Bird LLP

(57) ABSTRACT

Methods, apparatuses, systems, and computer program products are provided. An example method comprises receiving a change trigger; and providing two or more map versions to a plurality of vehicle apparatuses. The map versions may comprise a stable map version and a changed map version. The example method further comprises receiving two or more responses from at least two of the plurality of vehicle apparatuses. A response comprises an indicator of a preferred map version selected by a vehicle apparatus of the plurality of vehicle apparatuses from the two or more map versions. The example method further comprises analyzing the responses to determine a most preferred map version; and when it is determined that the most preferred map version is a changed map version, updating one or more map databases based at least in part on the changed map version.

24 Claims, 5 Drawing Sheets

(56) References Cited

U.S. PATENT DOCUMENTS

| | | | |
|---|---|---|---|
| 2013/0046738 A1* | 2/2013 | Kuo | G06Q 30/0631 |
| | | | 707/690 |
| 2013/0245941 A1* | 9/2013 | Stahlin | G01C 21/28 |
| | | | 701/532 |
| 2016/0007209 A1 | 1/2016 | Hohs et al. | |
| 2016/0259814 A1* | 9/2016 | Mizoguchi | G06F 17/30241 |
| 2016/0358477 A1* | 12/2016 | Ansari | G08G 1/167 |
| 2017/0277716 A1* | 9/2017 | Giurgiu | G06F 16/2365 |
| 2018/0202814 A1* | 7/2018 | Kudrynski | G06T 7/55 |

\* cited by examiner

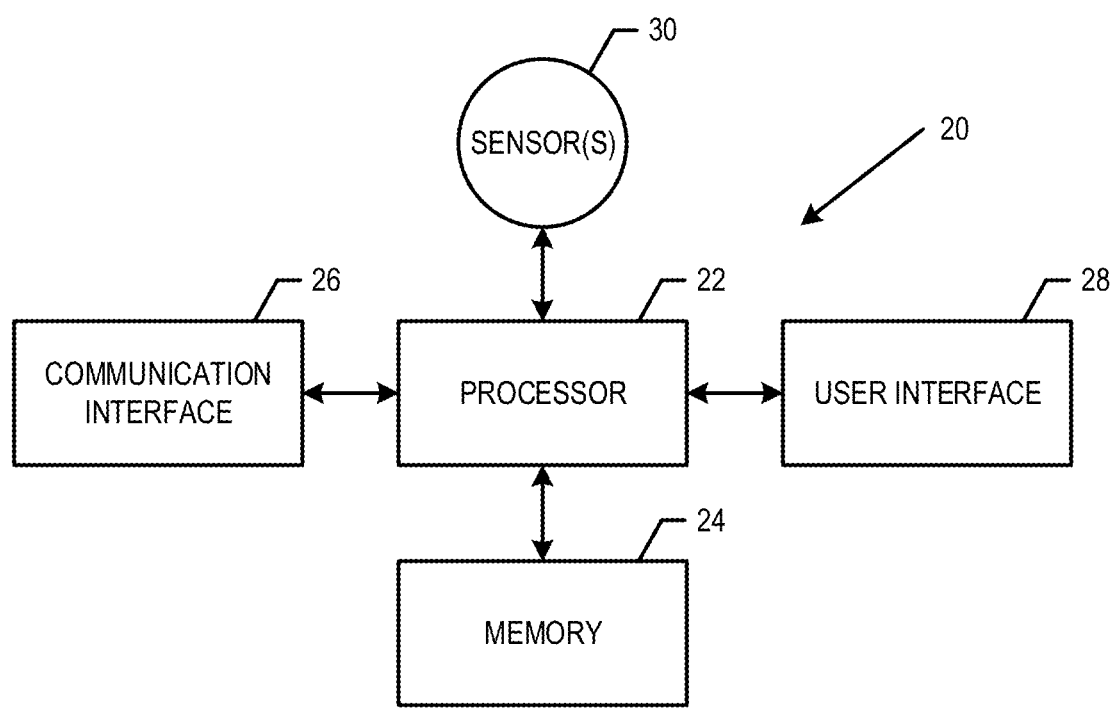

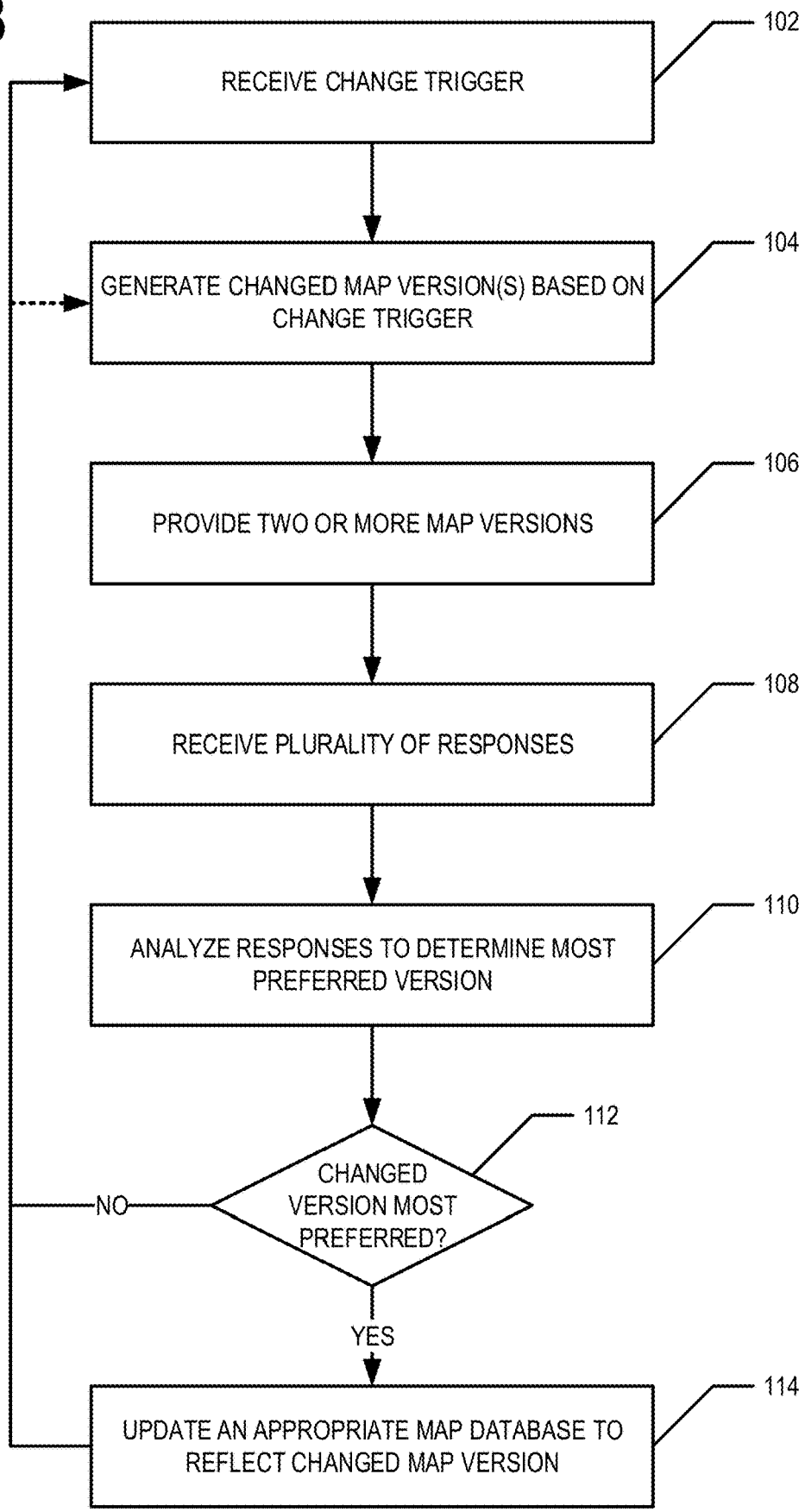

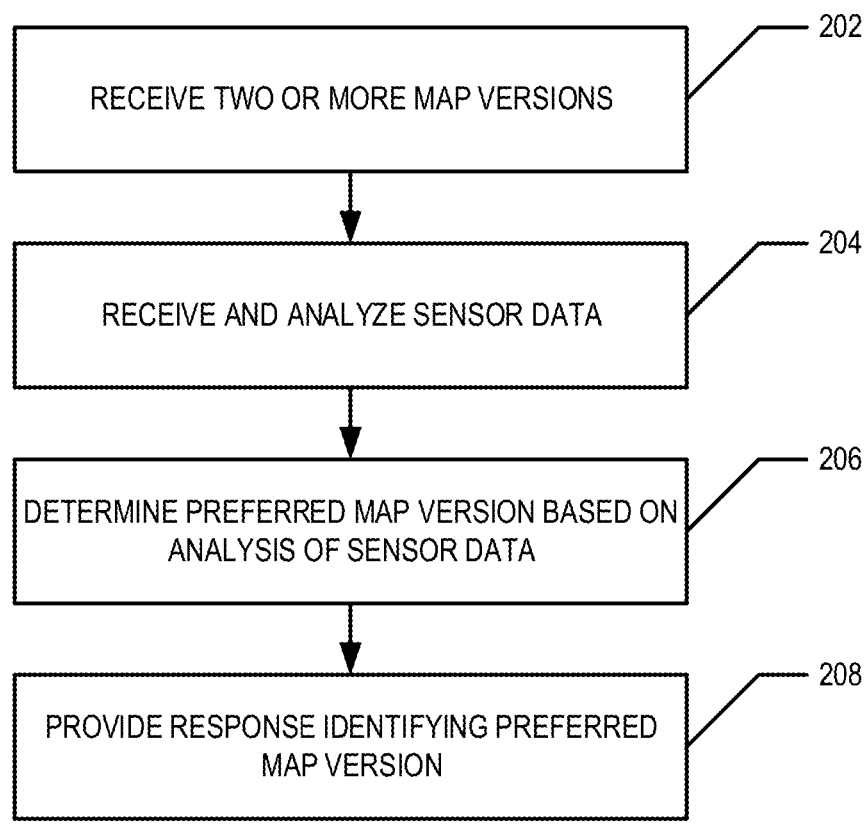

ITERATIVE MAP LEARNING BASED ON VEHICLE ON-BOARD SENSOR DATA

TECHNOLOGICAL FIELD

Example embodiments relate generally to updating a digital map. In particular, example embodiments generally relate to the use of vehicle sensor data to determine a preferred version of a digital map.

BACKGROUND

Consumer vehicles are capable of capturing high-volume, detailed, on-board road sensor data. For example, consumer vehicles may capture a high-volume of detailed, on-board road sensor data that may be used for assisted and/or autonomous driving. Unfortunately, most of this detailed data is generally thrown away; with only a minimal amount of information broadcast or stored for later use. The data is typically too voluminous to store or transmit; and may be discarded for privacy issues. Thus, a large volume of information collected by consumer vehicles is discarded and not available for off-board processing; therefore, potential map learning suffers due to privacy and transmission limitations.

BRIEF SUMMARY

Example embodiments allow a map to be updated based on the high-volume, detailed, on-board road sensor data captured by consumer vehicles without requiring a large volume of data transmission and without raising privacy issues. For example, an on-board vehicle apparatus may be provided with two or more maps versions corresponding to a map tile. Based on the detailed on-board sensor data captured, the vehicle apparatus may select one of the map versions of as the preferred map version and provide a response accordingly. An update apparatus may receive a plurality of responses indicating a preferred map version from a plurality of vehicle apparatuses and determine a most preferred map version based thereon. The process may be reiterated to determine a map update that most effectively reflects the roadway as experienced by the vehicle apparatuses and the corresponding on-board sensors. In example embodiments, one or more map databases may be updated in real- or near real-time based on the received responses.

Methods, apparatus, and computer program products are provided in accordance with an example embodiment in order to determine a map update. In example embodiments, at least one change trigger is received. Two or more map versions may be provided to a plurality of vehicle apparatuses. The two or more versions of the map tile may comprise at least one changed map version. Two or more responses may be received from at least two of the plurality of vehicle apparatuses. A response of the two or more responses may comprise an indicator of a preferred map version that was selected by a vehicle apparatus of the plurality of vehicle apparatuses from the two or more versions of the map tile. The responses may be analyzed to determine a most preferred map version. When it is determined that the most preferred map version is a changed map version, a map database is updated based at least in part on the changed map version.

In accordance with an example embodiment, a method is provided. The method comprises receiving at least one change trigger. The method may further comprise providing two or more map versions to a plurality of vehicle apparatuses. The two or more versions of the map tile may comprise at least one changed map version. The method may further comprise receiving two or more responses from at least two of the plurality of vehicle apparatuses. A response of the two or more responses may comprise an indicator of a preferred map version, wherein the preferred map version was selected by a vehicle apparatus of the plurality of vehicle apparatuses from the two or more map versions. The method may further comprise analyzing the responses to determine a most preferred map version; and when it is determined that the most preferred map version is a changed map version, updating a map database based at least in part on the changed map version.

In example embodiments, a vehicle apparatus of the plurality of vehicle apparatuses determines a preferred map version based at least in part on data collected by one or more sensors on-board a vehicle. In example embodiments, the method may further comprise, in response to analyzing the responses, generating a second changed version map version; and providing a second two or more map versions to a second plurality of vehicle apparatuses. The second two or more map versions may comprise the second changed map version. In example embodiments, the method may further comprise receiving two or more responses from at least two of the second plurality of vehicle apparatuses, wherein a response of the two or more responses may comprise an indicator of a second preferred map version selected by a vehicle apparatus of the second plurality of vehicle apparatuses from the second two or more map versions. In example embodiments, the method may further comprise analyzing the responses to determine a most preferred map version.

In example embodiments, the two or more map versions differ from each other by one or more link attributes, intersection attributes, and/or point of interest attributes. In example embodiments, the method may further comprise generating the changed map version by changing one or more link attributes, intersection attributes and/or point of interest attributes of a stable map version. In example embodiments, the change of the one or more link attributes, intersection attributes, and/or point of interest attributes is based at least in part on the at least one change trigger. In example embodiments, a change trigger of the at least one change trigger is a sensor data reporting received from a vehicle apparatus. In example embodiments, a response of the plurality of responses includes information that identifies the corresponding vehicle apparatus type. In example embodiments, the method may further comprise analyzing the responses to determine if a change indicated by the at least one change trigger is a temporary change or a long term change.

In accordance with an example embodiment, an apparatus is provided. The apparatus may comprise at least one processor and at least one memory storing computer program code. The at least one memory and the computer program code configured to, with the processor, cause the apparatus to at least receive at least one change trigger and provide two or more map versions to a plurality of vehicle apparatuses. The two or more versions of the map tile may comprise at least one changed map version. The at least one memory and the computer program code may be further configured to, with the processor, cause the apparatus to at least receive two or more responses from at least two of the plurality of vehicle apparatuses. A response of the two or more responses may comprise an indicator of a preferred map version selected by a vehicle apparatus of the plurality of vehicle apparatuses from the two or more map versions. The at least one memory and the computer program code may be further configured to, with the processor, cause the apparatus to at least analyze the responses to determine a most preferred map version; and when it is determined that the most preferred map version is changed map version, update a map database based at least in part on the changed map version.

In example embodiments, a vehicle apparatus of the plurality of vehicle apparatuses determines a preferred map version based at least in part on data collected by one or more sensors on-board a vehicle associated with the vehicle apparatus. In example embodiments, the at least one memory and the computer program code are further configured to, with the processor, cause the apparatus to at least in response to analyzing the responses, generate a second changed map version; and provide a second two or more versions to a second plurality of vehicle apparatuses. The second two or more map versions may comprise the second changed map version. In example embodiments, the at least one memory and the computer program code may be further configured to, with the processor, cause the apparatus to at least receive two or more responses from at least two of the second plurality of vehicle apparatuses, and analyze the responses to determine a second most preferred map version. A response of the two or more responses may comprise an indicator of a preferred map version selected by a vehicle apparatus of the second plurality of vehicle apparatuses from the second two or more map versions.

In example embodiments, the two or more map versions differ from each other by one or more link attributes, intersection attributes, and/or point of interest attributes. In example embodiments, the at least one memory and the computer program code are further configured to, with the processor, cause the apparatus to at least generate the changed map version by changing one or more link attributes, intersection attributes and/or point of interest attributes of a stable map version. In example embodiments, the change of the one or more link attributes, intersection attributes, and/or point of interest attributes is based at least in part on the at least one change trigger. In example embodiments, a change trigger of the at least one change trigger is a sensor data reporting received from a vehicle apparatus. In example embodiments, a response of the plurality of responses includes information that identifies the corresponding vehicle apparatus type. In example embodiments, the at least one memory and the computer program code are further configured to, with the processor, cause the apparatus to at least analyze the responses to determine if a change indicated by the at least one change trigger is a temporary change or a long term change.

In accordance with an example embodiment, a computer program product is provided. The computer program product may comprise at least one non-transitory computer-readable storage medium having computer-executable program code instructions stored therein. The computer-executable program code instructions comprising program code instructions configured to receive at least one change trigger and provide two or more map versions to a plurality of vehicle apparatuses. The two or more versions of the map tile may comprise at least one changed map version. The computer-executable program code instructions may further comprise program code instructions configured to receive two or more responses from at least two of the plurality of vehicle apparatuses. A response of the two or more responses may comprise an indicator of a preferred map version selected by a vehicle apparatus of the plurality of vehicle apparatuses from the two or more map versions. The computer-executable program code instructions may further comprise program code instructions configured to analyze the responses to determine a most preferred map version; and when it is determined that the most preferred map version is a changed map version, update a map database based at least in part on the changed map version.

In example embodiments, a vehicle apparatus of the plurality of vehicle apparatuses determines a preferred map version based at least in part on data collected by one or more sensors on-board a vehicle associated with the vehicle apparatus. In example embodiments, the computer-executable program code instructions may further comprise program code instructions configured to in response to analyzing the responses, generate a second changed map version; and provide a second two or more map versions to a second plurality of vehicle apparatuses. The second two or more map versions may comprise the second changed map version. In example embodiments, the computer-executable program code instructions may further comprise program code instructions configured to receive two or more responses from at least two of the second plurality of vehicle apparatuses, and analyze the responses to determine a second most preferred map version. A response of the two or more responses may comprise an indicator of a preferred map version selected by a vehicle apparatus of the second plurality of vehicle apparatuses from the second two or more map versions.

In example embodiments, the two or more map versions differ from each other by one or more link attributes, intersection attributes, and/or point of interest attributes. In example embodiments, the computer-executable program code instructions may further comprise program code instructions configured to generate the changed map version by changing one or more link attributes, intersection attributes and/or point of interest attributes of a stable map version. In example embodiments, the change of the one or more link attributes of the one or more links is based at least in part on the at least one change trigger. In example embodiments, a change trigger of the at least one change trigger is a sensor data reporting received from a vehicle apparatus. In example embodiments, a response of the plurality of responses includes information that identifies the corresponding vehicle apparatus type. In example embodiments, the computer-executable program code instructions may further comprise program code instructions configured to analyze the responses to determine if a change indicated by the at least one change trigger is a temporary change or a long term change. In accordance with yet another example embodiment of the present invention, an apparatus is provided. The apparatus comprises means for receiving at least one change trigger. The apparatus may further comprise means for providing two or more map versions to a plurality of vehicle apparatuses. The apparatus may further comprise means for receiving two or more responses from at least two of the plurality of vehicle apparatuses. A response of the two or more responses may comprise an indicator of a preferred map version, wherein the preferred map version was selected by a vehicle apparatus of the plurality of vehicle apparatuses from the two or more map versions. The apparatus may further comprise means for analyzing the responses to determine a most preferred map version; and when it is determined that the most preferred map version is a changed map version, updating a map database based at least in part on the changed map version.

Methods, apparatus, and computer program products are provided in accordance with an example embodiment in order to provide a response regarding a preferred map version selected from two or more map versions. In example embodiments, two or more map versions are received. Sensor data corresponding to a link, intersection, or point of interest in the map received. At least a portion of the sensor data is analyzed. Based at least in part on a result of analyzing the at least a portion of the sensor data, a preferred map version is selected from the two or more map versions. The preferred map version is better aligned with the result of the analysis of the at least a portion of the sensor data than the other of the two or more map versions. A response indicating the preferred map version is provided.

In example embodiments, the sensor data corresponding to the link, intersection, or point of interest is collected by one or more sensors on-board a vehicle as the vehicle traverses the link, intersection, or vicinity of the point of interest. In example embodiments, the two or more map versions differ from each other by one or more link attributes, intersection attributes, and/or point of interest attributes. In an example embodiment, the at least one memory and the computer program code are further configured to, with the processor, cause the apparatus to at least prior to receiving the two or more map versions, receive and analyze sensor data; determine at least one difference between a result of analyzing the sensor data and a corresponding map tile; and report at least a portion of the sensor data.

In accordance with yet another example embodiment of the present invention, an apparatus is provided. The apparatus comprises means for receiving two or more map versions. The apparatus may further comprise means for receiving two or more map versions of a map tile to a plurality of vehicle apparatuses. The apparatus may further comprise means for receiving sensor data corresponding to a link, intersection, and/or point of interest in the map. The apparatus may further comprise means for analyzing at least a portion of the sensor data. The apparatus may further comprise means for, based at least in part on a result of analyzing the at least a portion of the sensor data, select a preferred map version from the two or more map versions. The preferred map version is better aligned with the result of the analysis of the at least a portion of the sensor data than the other of the two or more map versions. The apparatus may further comprise means for providing a response indicating the preferred map version.

BRIEF DESCRIPTION OF THE DRAWINGS

Figure 1:
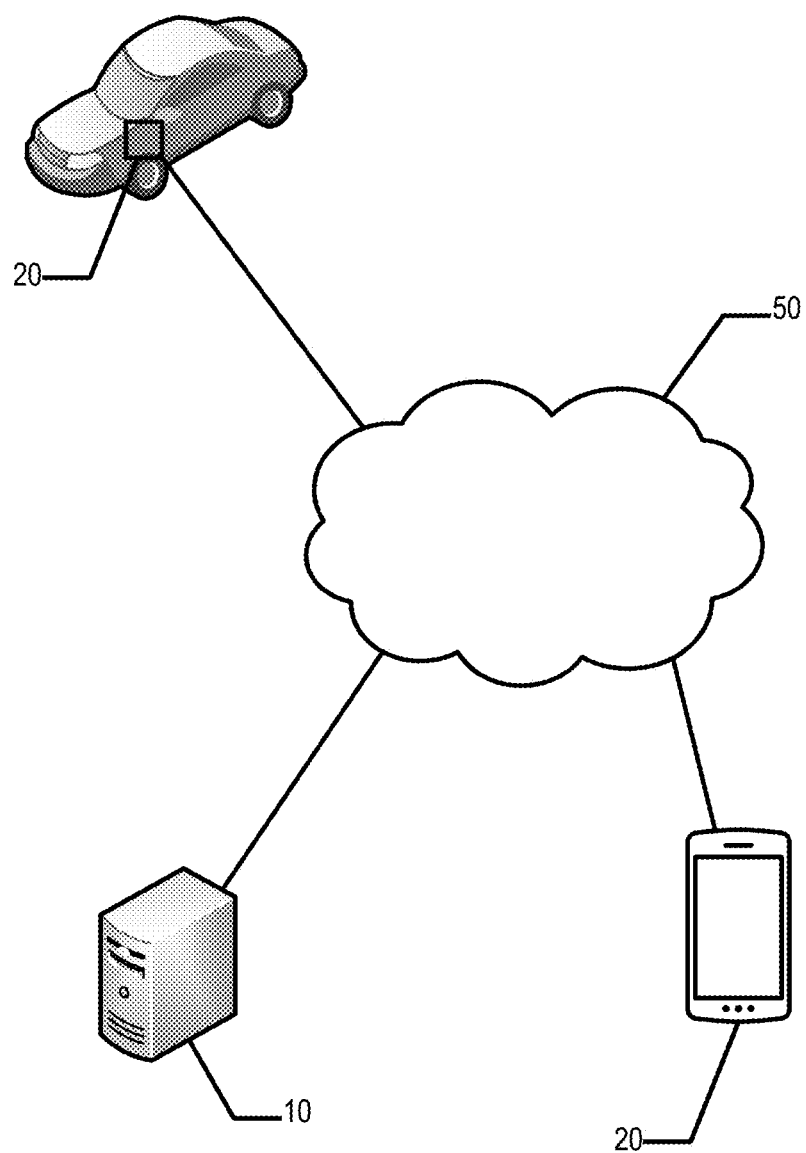
Figure 2A:
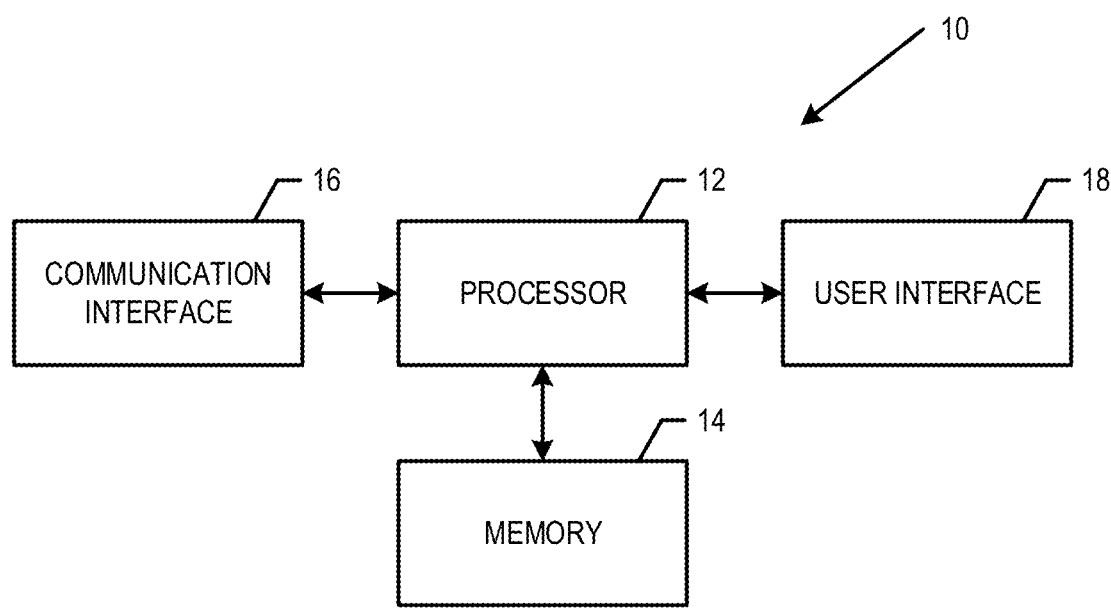

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of an update apparatus that may be specifically configured in accordance with an example embodiment;

FIG. 2B is a block diagram of an vehicle apparatus that may be specifically configured in accordance with an example embodiment;

FIG. 3 is a flowchart illustrating operations performed, such as by the update apparatus of FIG. 2A, in accordance with an example embodiment; and FIG. 4 is a flowchart illustrating operations performed, such as by the vehicle apparatus of FIG. 2B, in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

I. General Overview

Methods, apparatus and computer program products are provided in accordance with an example embodiment in order to provide map updates for a tiled map. For example, the map may be tiled such that map information/data may be stored, received, provided, transmitted, and/or the like in a modular format (e.g., tile by tile). In various embodiments, the tiles may be defined by a set of parallel and perpendicular tile boundaries. For example, the tiles may be rectangular or square (e.g., 2 km by 2 km squares). In other embodiments, the tiles may be defined by boundaries which are curved, not parallel and/or perpendicular to one or more other boundaries, and/or the like. In various embodiments, the tiles may be a uniform tiling of the map. In other embodiments, the tiles may vary in size and/or shape based on the geography of the map region, the topology of the map region, population density within the map region, and/or the like.

In example embodiments, an update apparatus may receive a change trigger from one or more vehicle apparatuses indicating that a link shape, a link attribute of a particular link, an intersection attribute of a particular intersection, a point of interest (POI) attribute of a particular POI, as measured/determined by the vehicle apparatus, differs from the corresponding link attribute, intersection attribute, or POI attribute provided by a stable version of a map. In example embodiments, a stable map version may be a previous map version. For example, a stable map version may be a map version from before a change trigger is received. The update apparatus may then generate one or more changed versions and provide two or more map versions to a plurality of vehicle apparatuses. The map versions may be versions of a map tile, layers of a map tile, differing versions of embedded information, and/or the like. As used herein, a map version may be a version of a map tile or a portion of a map corresponding to a map tile; a version of a link, intersection, or POI; a version of an attribute of a link, intersection, or POI. For example, the update apparatus may provide at least one of the one or more changed version map tiles and a stable version map tile to one or more vehicle apparatuses that are in the vicinity or expected to be within the vicinity of the particular link or particular intersection in the near future. In another example, the update apparatus may provide a map tile having one or more layers that correspond to changes in a link attribute, intersection attribute, or POI attribute with respect to another layer of the map tile. The vehicle apparatus may use the on-board sensor data to determine a preferred version from the provided versions. For example, the vehicle apparatus may use the on-board sensor data to select a preferred version of the map tile, a preferred layer, a preferred set of embedded information, and/or the like. The vehicle apparatus may provide a response to the update apparatus indicating the preferred version. After receiving a plurality of responses, the update apparatus may determine a most preferred map version and update a map database accordingly, if necessary. Thus, example embodiments of the present invention provide for the stable map data or other map database to be updated based on the vehicle on-board sensor data without transmitting a large volume of data and without raising privacy concerns. As should be understood, the present invention may relate to updating links, intersections (or nodes), and/or POIs and/or the corresponding link, intersection, and/or POI attributes. However, the discussion of example embodiments provided below is provided in terms of links and link attributes for the sake of clarity. Therefore, it should be understood by one of skill in the art that aspects of the present invention may be used to update map information/data corresponding to intersections (or nodes) and/or POIs as well as links.

In example embodiments, the detailed on-board sensor data may be used compute an estimated real-time model of the road and associated attributes; such as shape of the road, estimated speed-limit, number of lanes, etc. on-board the vehicle. This temporary on-board model might be used to assist autonomous driving. Likewise, this temporary model might be compared to multiple versions links and/or link attributes provided through different versions of a map tile, layers of a map tile, embedded information of a map tile, and/or the like. For example, one map version of a particular link (version A) might indicate that the roadway corresponding to the particular link has four lanes, while a second version (version B) might indicate that the roadway corresponding to the particular link has a new, fifth lane. If the temporary on-board model indicates that the roadway corresponding to the particular link has five lanes, map version B may be selected as the optimal map version. The vehicle then might transmit the selection of Version B to the update apparatus. Likewise, map version A might define the shape of the road differently than version B. The on-board model's estimated road shape may compare more favorably with the shape of map version B. The vehicle apparatus may indicate that the move favorable comparison with map version B by transmitting the selected map version ID to the update apparatus, rather than transmitting the actual shape details of the temporary model and/or detailed sensor data.

In an example embodiment, data sampling may be used in order to initially create alternative map versions. The on-board vehicle detailed sensor information might be sparsely (randomly, or triggered) provided to an update apparatus. For example, the sparse reporting of the on-board sensor data may act as probe data and/or may be a change trigger. The sparse reporting may be too sparse to model an accurate road, but may provide an indication of potential changes to the map. Using the sparse reporting of the on-board sensor data, the update apparatus may hypothesize several likely, but low confidence map versions. These map versions can then be provided to other vehicle apparatuses as they later traverse the same road. These vehicles may use their detailed sensor data to select which of the hypothesized map versions best agrees with the sensor observations as in previously defined embodiments.

In further example embodiments, multiple map versions may be provided for specific links and attributes within a single tile. For example, a single map tile is delivered to the vehicle. Within the tile, link A might have three versions, a first link attribute of link B might have two versions, a second link attribute of link B may have four versions, and all other links within the map tile might have a single version. As a vehicle traverses the map, a selection may be made to choose a "best-fit" version for each link and link attribute as the vehicle traverses that link. A response may be provided delivering the link/attribute identifier and version identifier of the selected "best-fit" version for one or more links and/or link attributes to the update apparatus.

FIG. 1 provides an illustration of an example system that can be used in conjunction with various embodiments of the present invention. As shown in FIG. 1, the system may include one or more vehicle apparatuses 20, one or more update apparatuses 10, one or more networks 50, and/or the like. In various embodiments, the vehicle apparatus 20 may be an in vehicle navigation system, vehicle control system, a mobile computing device, and/or the like. For example, a vehicle apparatus 20 may be an in vehicle navigation system mounted within and/or be on-board a vehicle such as a motor vehicle, non-motor vehicle, automobile, car, scooter, truck, van, bus, motorcycle, bicycle, Segway, golf cart, and/or the like. In various embodiments, the vehicle apparatus 20 may be a smartphone, tablet, personal digital assistant (PDA), and/or other mobile computing device. In another example, the vehicle apparatus 20 may be a vehicle control system configured to autonomously drive a vehicle, assist in control of a vehicle, process information/data collected, captured, gathered, or measured by one or more on-board sensors, and/or the like. In example embodiments, the vehicle apparatus 20 may be a map data gathering apparatus configured to collect, capture, gather, measure, and/or the like sensor data related to a path of travel and process at least a portion of that sensor data. For example, the sensor data could relate to automobile, bicycle, pedestrian, ski, train or other types of travel. For example, the travel may include indoor travel (e.g., within a mall) or travel within another bounded area (e.g., an outdoor amusement park). The map data may relate to a wide variety of types of navigational maps.

In example embodiments, an update apparatus 10 may comprise components similar to those shown in the example update apparatus 10 diagrammed in FIG. 2A. In example embodiments, a vehicle apparatus 20 may comprise components similar to those shown in the example vehicle apparatus 20 diagrammed in FIG. 2B. In various embodiments, the update apparatus 10 may be located remotely from the vehicle apparatus 20. Each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In some embodiments, a network 50 may comprise the automotive cloud, digital transportation infrastructure (DTI), radio data system (RDS)/high definition radio (HD) or other digital radio system, and/or the like. For example, a vehicle apparatus 20 may be in communication with an update apparatus 10 via the network 50. For example, the vehicle apparatus 20 may communicate with the update apparatus 10 via the Cloud.

In example embodiments, as shown in FIG. 2B, the vehicle apparatus 20 may comprise a processor 22, memory 24, a user interface 28, one or more sensors 30 (e.g., a location sensor such as a GPS sensor; camera(s); 2D and/or 3D LiDAR(s); long, medium, and/or short range RADAR; ultrasonic sensors; electromagnetic sensors; (near-)IR cameras, 3D cameras, 360° cameras, accelerometer(s), gyroscope(s), and/or other sensors that enable the vehicle apparatus to determine one or more features of the corresponding vehicle's surroundings), a communications interface 26, and/or other components configured to perform various operations, procedures, functions or the like described herein. Similarly, as shown in FIG. 2A, the update apparatus 10 may comprise a processor 12, memory 14, a user interface 18, a communications interface 16, and/or other components configured to perform various operations, procedures, functions or the like described herein. Example embodiments of the vehicle apparatus 20 and the update apparatus 10 are described in more detail below with respect to FIGS. 2A and 2B.

II. Exemplary Operation

In example embodiments, the update apparatus 10 may receive a change trigger. For example, probe data received from a vehicle apparatus 20 may indicate that a link attribute of a particular link, according to a stable version of the corresponding map tile, is incorrect. The update apparatus 10 may generate one or more changed map versions. The changed map version may be generated by one or more random changes to the stable version of the corresponding map tile, in some embodiments. In other embodiments, the changed map version may be generated by making one or more changes to the stable version of the corresponding map tile based on the change trigger. For example, one or more link attributes of a stable map version may be changed to generate a changed version. For example, if a report that the speed limit of a particular link is 55 mph and the stable map version of the map tile indicates that the speed limit of the particular link is 60 mph, the changed version may differ from the stable version by a change in the speed limit for the particular link from 60 mph to 55 mph. The update apparatus 10 may provide two or more versions (e.g., the stable map version and/or one or more changed versions) to a plurality of vehicle apparatuses 20 in the vicinity of the particular link and/or that are expected to be in the vicinity of the particular link in the near future (e.g., the next minute, next five minutes, next ten minutes, next half an hour, and/or the like). For example, the plurality of map versions may be sent as a plurality of versions of the map tile, as layers within a map tile, as information embedded within the map tile, and/or the like.

In example embodiments, a plurality of vehicle apparatuses 20 may receive a two or more versions corresponding to the same map tile. For example, a changed map version may be the same as the stable map version but with a link attribute for a particular link changed. In another example, a changed version may be a map layer comprising a community edited version of a map tile. Each vehicle apparatus 20 analyzes the sensor data collected by the corresponding sensors 30 on-board the corresponding vehicle and determines a preferred version based on the analysis of the sensor information/data. For example, the vehicle apparatus 20 may analyze sensor information/data captured by the on-board sensors 30 and select a preferred version that most closely aligns with the results of the sensor information/data analysis. The vehicle apparatus 20 may then provide a response comprising an indicator of the preferred version to the update apparatus 10.

After receiving a plurality of responses from a plurality of vehicle apparatuses 20, the update apparatus 10 may determine and/or identify a most preferred version. For example, the update apparatus 10 may count the number of responses selecting the stable map version as the preferred version map tile and count the number of responses selecting a changed map version as the preferred map version. In an example embodiment, the most preferred version is the version of the map that the majority of the responses indicates was selected as the preferred version. After determining a most preferred version, the update apparatus 10 may update the one or more map databases to reflect the most preferred map version. Various aspects of the present invention will now be described in more detail.

Updating a Map Based on Vehicle On-Board Sensor Information/Data

FIG. 3 provides a flowchart of operations performed by the update apparatus 10 to update a map based on vehicle on-board sensor information/data. For example, two or more map versions may be provided to a plurality of vehicle apparatuses 20. Each vehicle apparatus 20 may select a preferred map version from the two or more versions and provide a response to the update apparatus 10 comprising an indicator of the preferred version. The update apparatus 10 may then update the map tile based on the received responses.

Starting at block 102, a change trigger may be received. For example, the update apparatus 10 may receive a change trigger. For example, the update apparatus may comprise means, such as processor 12, communications interface 16, and/or the like, for receiving a change trigger. For example, a change trigger may be a report from one or more vehicle apparatuses 20 indicating that a link attribute of a particular link may be incorrect. In example embodiments, a link represents a road or path segment in a map. For example, the link attributes of a particular link may comprise one or more of a link identifier configured to (uniquely) identify a link, link geometry information/data configured to describe the shape and/or length of the link, a link location configured to provide geo-location information for one or both ends of a link, one or more intersection identifiers configured to identify one or more intersections that define an end of the link, a range of street numbers configured to identify the street numbers located along the link, a speed limit, a link width, a road wall indicator, a traffic direction flow indicator, a carpool lane presence indicator, a car open indicator, a through traffic indicator, time restriction(s), a driving side indicator, a controlled access indicator, a service road indicator, a construction indicator, a ferry indicator, a private road indicator, seasonal closures, link height/weight restrictions, and/or the like. Another example of a change trigger may be that a community edited version of the map differs from a stable version of the map by more than a threshold degree of difference (e.g., the value of difference for a particular link attribute is greater than a threshold value, more than a threshold number of link attributes are different, and/or the like). In an example embodiment, a change trigger may be an indication that more than a predetermined period of time has elapsed since the stable version of the map was last updated. In another example, a change trigger may be a change in the behavior of probe vehicles. Previous probe data may indicate that probes generally traveled the roadway corresponding to the particular link at 65 mph but current probe data may indicate that probes are currently generally traveling the roadway corresponding to the particular link at 55 mph. Other examples of changes in probe data that may comprise a change trigger are a consistent shift in probes a few meters to the left/right, indicating a lane opening/closure; unexpected changes in direction of travel, hinting towards a closed road or one-way street change; wait times at an intersection being random rather than phased, indicative of a roundabout replacing traffic lights; and/or the like. As should be understood a variety of change triggers may be received in accordance with various embodiments of the present invention.

At block 104, one or more changed map versions are generated. For example, the update apparatus 10 may generate one or more changed map versions. For example, the update apparatus 10 may comprise means, such as processor 12 and/or the like, for generating one or more change map versions. In example embodiments, a changed map version may be generated by changing one or more link attributes of the stable map version, incorporating one or more changes between a community edited map and a stable map into a map layer, creating a map tile, map layer, or embedded map information/data from a community edited map that corresponds to a geographical region that overlaps at least in part with the geographical region corresponding to a stable version map tile, and/or the like. In example embodiments, each map tile may comprise a tile identifier configured to identify the map tile in relation to other tiles of the map and a version identifier configured to identify a particular map version (e.g., version of the map tile, layer of the map tile, set of information/data embedded within the map tile). In one embodiment, the tile identifier and version identifier are incorporated into one tile version identifier configured to uniquely identify a particular version of a particular map tile. In example embodiments, each of the map version of a map tile may be uniquely identified based on the corresponding tile and/or version identifier(s).

In some embodiments, a change made to the stable version map tile to create the changed map version may be based on the change trigger. For example, if the change trigger is one or more reports of the speed limit along a particular link that differs from the speed limit indicated by the stable version map tile for the particular link, the changed map version may differ from the stable map version by the speed limit for the particular link. The amount and direction in which the speed limit of the changed map version differs from the stable map version may also be based on the change trigger. For example, if the reports indicate that the speed limit for the particular link is 50 mph and the stable map version indicates that the speed limit for the particular link is 60 mph, the changed map version may indicate that the speed limit for the particular link is 50 mph. In some embodiments, more than one changed map version may be generated. For example, a first changed version may be generated that indicates that the speed limit along the particular link is 40 mph, a second changed version may be generated that indicates that the speed limit along the particular link is 50 mph, and a third changed version may be generated that indicates that the speed limit along the particular link is 70 mph. Thus, one or more changed map versions may be generated as appropriate for the change trigger and/or the application.

At block 106, two or more map versions of a map tile are provided. For example, the two or more map versions may comprise the stable map version and at least one of the one or more changed map versions, wherein the changed map version comprises at least one link attribute of a particular link that is different from the corresponding link attribute of the particular link in the stable map version map. In an example embodiment, the two or more map versions may comprise two or more changed versions that differ from each other by at least one link attribute of a particular link. For example, the update apparatus 10 may provide two or more map versions. For example, the update apparatus 10 may comprise means, such as the processor 12, communications interface 16, and/or the like, for providing two or more map versions. In example embodiments, the two or more map versions of a map tile are provided (e.g., transmitted) to a plurality of vehicle apparatuses 20 through a network 50. In example embodiments, the two or more map versions of a map tile may be provided to a plurality of vehicle apparatuses 20 that are in the vicinity of the map tile or the particular link, are expected to traverse the particular link in the near future (e.g., next 1, 2, 5, 10, 30 minutes, or the like), are expected to be in the vicinity of the map tile or the particular link in the near future, and/or the like. For example, the two or more map versions may be provided to a vehicle apparatus 20 that is on-board a vehicle traveling a route or a predicted route that traverses the particular link.

At block 108, a plurality of responses are received from at least a subset of the plurality of vehicle apparatuses 20. For example, the update apparatus 10 may receive a plurality of responses. For example, the update apparatus 10 may comprise means, such as processor 12, communications interface 16, and/or the like, for receiving a plurality of responses. For example, a response may comprise a preferred map version identifier configured to identify one of a stable map version map tile or a changed map version selected by a vehicle apparatus 20 as a preferred version based on the analysis of on-board sensor information/data performed by the vehicle apparatus 20. For example, a response may comprise a version identifier and/or the like configured to identify the preferred map version selected by the vehicle apparatus 20. Thus, rather than receiving a large volume of sensor information/data from each of a plurality of vehicle apparatuses 20, the update apparatus 10 may receive a version identifier for a preferred map version that most closely aligns with the sensor information/data collected by the sensors 30 on-board the vehicle and/or the analysis thereof by the vehicle apparatus 20 on-board the vehicle.

In example embodiments, a response may comprise information/data indicating the degree to which a vehicle apparatus 20 preferred one map version over one or more other map versions. For example, the response may comprise more than one version identifier and a corresponding fraction or percentage. For example, the update apparatus may have provided Version A and Version B. A response may indicate that Version A was 75% the preferred tile and Version B was 25% the preferred tile. For example, the two or more tiles may differ by more than one link attribute. In another example, the percentage or fraction of preferred may indicate a relative degree to which the two or more map versions match the result(s) of the analysis of on-board sensor information/data performed by the vehicle apparatus 20.

In example embodiments, a response may comprise vehicle identification information/data. For example, a response may indicate the type, make, model, trim package, year and/or the like of the vehicle associated with the vehicle apparatus 20; a sensor configuration and/or sensor configuration information/data associated with the sensors 30 and/or the vehicle apparatus 20; and/or the like. In some embodiments, the update apparatus 10 may determine a most preferred map version for a particular type, make, model, trim package, year and/or the like of vehicle; a most preferred map version for a particular type of sensor configuration associated with the vehicle apparatus 20; and/or the like. As should be understood, in various embodiments, the response may comprise various information/data identifying the vehicle apparatus 20 and/or the corresponding vehicle such that, if desired, the most preferred map version may be determined for a subset of vehicle apparatuses 20 and/or corresponding vehicles.

In an example embodiment, a response may comprise a short term change indicator. For example, one or more sensors 30 on-board the vehicle may identify a construction sign, sign indicating a festival or road race is occurring, and/or the like indicating that a change to the corresponding roadway (e.g., a lane closure) represented by a particular link may be temporary. If the vehicle apparatus 20 detects one or more indications that a temporary situation is occurring corresponding to a particular link having a changed attribute (e.g., a link that has a link attribute according to Version A that is different from the corresponding link attribute according to Version B), the vehicle apparatus may flag the response with a short term change indicator. The update apparatus 10, when receiving a response comprising a short term change indicator may then know that if a changed version map tile was selected as the preferred version map tile, that the change to the link (with respect to the stable map version) may be a temporary or short term change.

At block 110, the plurality of responses may be analyzed to determine a most preferred map version. For example, the update apparatus 10 may analyze the plurality of responses to determine a most preferred map version. For example, the update apparatus 10 may comprise means, such as processor 12 and/or the like, for analyzing the plurality of responses to determine a most preferred map version. In example embodiments, the plurality of responses may be analyzed after at least a pre-determined number of responses are received, responses have been received for at least a pre-determined amount of time, a pre-determined time window for receiving responses has expired, and/or the like. In various embodiments, the most preferred map version may be the map version which was selected by a majority of the vehicle apparatuses 20 as indicated by the received responses. For example, the received responses may indicate that 60% of the vehicle apparatuses 20 selected Version A, 30% of the vehicle apparatuses 20 selected Version B, and 10% of the vehicle apparatuses 20 selected Version C as the preferred map version. Thus, the update apparatus 10 may analyze the received responses and determine that the most preferred map version is Version A. In another example, Response X may indicate that Version A is 75% the preferred tile and Version B was 25% the preferred tile and Response Y may indicate that Version A is 70% the preferred tile and Version B was 30% the preferred tile. In an example embodiment, the update apparatus 10 may analyze the responses by adding together the percent assigned to each version to determine that Version A received a score of 145 and Version B received a score of 55 and, based thereon, Version A may be determined to be the most preferred map version. In another example embodiment, the update apparatus 10 may analyze the responses by averaging the percentage assigned to each tile to determine that Version A is 72.5% preferred and Version B is 27.5% preferred and, based thereon, Version A may be determined to be the most preferred map version. As noted above, the analysis of the responses may be segmented to determine a most preferred map version for a particular sector or subset of vehicles, vehicle apparatuses 20, and/or the like, in example embodiments.

At block 112, it is determined if one of the changed map versions was determined to be the most preferred map version. For example, the update apparatus 10 may determine if a changed map version was determined to be the most preferred map version. For example, the update apparatus 10 may comprise means, such as processor 12 and/or the like, for determining if a changed map version was determined to be the most preferred map version. If it is determined that a changed map version is not the most preferred map version (e.g., the stable map version is the most preferred version) the process may return to block 102 to await another change trigger and/or proceed to block 104 and generate another one or more changed map versions.

If, at block 112, it is determined that a changed map version is was determined to be the most preferred map version, the process continues to block 114. At block 114, one or more map databases may be updated to include the one or more differences between the stable map version and the most preferred map version (e.g., a changed map version). For example, the update apparatus 10 may update one or more map databases to include the one or more differences between the stable map version and the changed map version. For example, the update apparatus 10 may comprise means, such as the processor 12, memory 14, and/or the like, for updating one or more map databases to include the one or more differences between the stable map version and the most preferred map version. For example, a map database may correspond to a particular type of vehicle and/or vehicle apparatus 20, a particular time frame (e.g., for temporary changes), a "live" map, a day time map, a night time map, and/or other generic or specialized map database.

In example embodiments, if one or more responses comprised a short term change indicator, a map database corresponding to temporary roadway situations may be updated. The stable map version and the most preferred map version may continue (e.g., periodically, regularly, and/or the like) to be provided to vehicle apparatuses 20 such that additional responses may be gathered. The additional responses may be binned by time received (e.g., date received, date and hour received, and/or the like). The additional responses may be gathered for a predetermined amount of time, until the responses indicate that the temporary change is over (e.g., the responses indicate that the stable map version is the most preferred map version again), and/or the like. Once the temporary change is over, the map data base corresponding to temporary roadway situations may be correspondingly updated.

In various embodiments, after receiving and analyzing a plurality of responses with regard to a stable map version and one or more changed map versions, the process may return to block 104 and generate one or more new changed map versions. Two or more map versions (e.g., comprising at least one of the one or more new changed map versions)

may then be provided (e.g., to one or more vehicle apparatuses 20) such that responses selecting one of the one or more new changed map versions, a previously generated changed map version, or the stable map version as a preferred map version may be received (e.g., by the update apparatus 10). Thus, the process of updating one or more map databases by receiving responses from a plurality of vehicle apparatuses 20 selecting a preferred map version may be iterated such that the map database(s) may be updated to incorporate one or more changes to a roadway represented by a link in the map. Moreover, the update apparatus 10 may receive information/data regarding changes to a roadway represented by a link in the map wherein the information/data regarding the change is based on information/data gathered by one or more sensors 30 on-board the vehicle without requiring the vehicle apparatus 20 to transmit a large volume of information/data and without the update apparatus 10 needing to receive and process a large volume of raw information/data.

Using Vehicle On-board Sensor Information/Data to Select a Preferred Map Version In example embodiments, the vehicle apparatus 20 may receive two or more map versions of a map tile from an update apparatus 10. For example, the vehicle apparatus 20 may receive a stable map version and a changed map version. The vehicle apparatus 20 may be on-board a vehicle that traverses a roadway represented by a particular link in the map tile wherein one or more link attributes of the particular link are different between the two or more map versions of the map tile. Based on an analysis of information/data collected, recorded, measured, and/or the like by one or more sensors 30 as the vehicle traverses the roadway represented by the particular link, the vehicle apparatus 20 may select one of the two or more map versions as a preferred map version. For example, the preferred map version may be the version of the map tile that best represents the information/data collected, recorded, measured, and/or the like by the one or more sensors 30 and/or the analysis thereof by the vehicle apparatus 20. The vehicle apparatus 20 may then provide a response to the update apparatus 10 indicating the selected preferred map version.

FIG. 4 provides a flowchart of operations performed by a vehicle apparatus 20 to provide a response indicating a preferred map version. Starting at block 202, two or more map versions of a map tile are received. For example, the vehicle apparatus 20 may receive two or more map versions. For example, the vehicle apparatus 20 may comprise means, such as the processor 22, communications interface 26, and/or the like, configured for receiving two or more map versions. For example, the two or more versions of the map tile may comprise a stable map version and one or more changed map versions. The two or more map versions may be similar but may comprise one or more particular links for which one or more link attributes are different. For example, a road width attribute of a particular link in Version A may indicate that the particular link has two east bound lanes and one west bound lane while the particular link in Version B may indicate that the particular link has two east bound lanes and two west bound lanes. The vehicle apparatus 20 may be on-board a vehicle that within or about to enter a geographic region corresponding to the corresponding map tile, is following a route or a predicted route that travels along a roadway corresponding to the particular link, and/or the like. For example, the vehicle apparatus 20 may be on-board a vehicle that is expected to traverse a roadway represented by the particular link.

At block 204, the roadway represented by the particular link is traversed and sensor information/data is collected, captured, recorded, measured, and/or the like by the one or more sensors 30 and the sensor information/data is analyzed. For example, the vehicle apparatus 20 may traverse the roadway represented by the particular link and receive and analyze sensor information/data collected, captured, recorded, measured, and/or the like by the one or more sensors 30. For example, the vehicle apparatus 20 may comprise means, such as processor 22, memory 24, and/or the like, for receiving and analyzing sensor information/data collected, captured, recorded, measured, and/or the like by the one or more sensors 30 corresponding to the roadway represented by the particular link. For example, the memory 24 may comprise one or more algorithms, data analysis routines, and/or the like that, when executed by the processor 22, may cause analysis of sensor information/data. For example, the memory 24 may comprise a road width algorithm configured to analyze sensor information/data captured, collected recorded, measured, and/or the like by the one or more sensors 30 to determine a width of the road corresponding to the sensor information/data.

At block 206, the preferred map version may be determined or selected. For example, the vehicle apparatus 20 may determine or select a preferred map version. For example, the vehicle apparatus 20 may comprise means, such as processor 22 and/or the like, for determining or selecting a preferred map version. For example, it may be determined which map version best matches the results of the analysis of the sensor information/data. For example, if Version A indicates that a new lane starts 50 m from the intersection, Version B indicates a new lane starts 60 m from the intersection, and Version C indicates that there is no new lane, and the analysis of the sensor information/data indicates that a new lane starts 53 m after the intersection, Version B may be determined or selected as the preferred map version and thus Version B may be determined or selected as the preferred map version. If, in the above example, the analysis of the sensor information/data indicates that the new lane starts 55 m after the intersection, various rules may be in place that may be used to determine or select the preferred map version. For example, if Version A is a stable map version and Version B is a changed map version, Version B may be selected to indicate that the analysis of the sensor information/data differs from the stable map version. In another example, Version A may be selected as the preferred map version such that the new lane is not expected to exist before it actually starts. For some link attributes it may be determined that it's better to overestimate the attribute rather than under estimate the attribute, and in such a scenario, version B may be selected as the preferred map version.

In some embodiments, a preferred map version may be determined or selected as a matter of degree or relative degree. For example, Version A may be selected as 60% preferred and Version B may be chosen as 40% preferred. For example, if Version A indicates a new lane starts 50 m from the intersection, Version B indicates that a new lane start 60 m from the intersection, and the analysis of the sensor information/data indicates that a new lane starts 52 m from the intersection, Version A may be 25% preferred and Version B may be 75% preferred, and/or the like. For example, in embodiments wherein three or more versions of the map tile are provided and/or wherein two map versions may differ by more than one link attribute, determining or selecting a preferred map version by degree or relative degree may be helpful.

At block 208, a response indicating the preferred map version is provided. For example, the vehicle apparatus 20 may provide (e.g., transmit) a response indicating a preferred map version. For example, the vehicle apparatus 20 may comprise means, such as processor 22, communications interface 26, and/or the like, for providing a response indicating a preferred map version. For example, the response may be provided to and/or received by the update apparatus 10. For example, the response may comprise a preferred map version identifier configured to identify one of the two or more map versions. For example, the preferred map version identifier may identify a stable map version or a change map version selected by the vehicle apparatus 20 as the preferred map version based on the analysis of on-board sensor data performed by the vehicle apparatus 20. For example, a response may comprise a version identifier configured to identify the preferred map version selected by the vehicle apparatus 20. Thus, rather than providing or transmitting a large volume of sensor data, the vehicle apparatuses 20 may merely provide or transmit a response comprising a version identifier configured to identify the preferred map version. By providing the response, the vehicle apparatus 20 may indicate which of the provided map versions best matches the sensor information/data collected, captured, measured, recorded, and/or the like by the one or more sensors 30 associated with the vehicle apparatus 20 based on the analysis thereof by the vehicle apparatus 20, and therefore is the preferred map version for the vehicle apparatus 20.

In example embodiments, a response may comprise information/data indicating the degree to which the vehicle apparatus 20 prefers one map version over one or more other map versions. For example, the response may comprise more than one version identifiers and a corresponding fraction or percentage. For example, the response may indicate that Version A was 75% the preferred map version and Version B was 25% the preferred map version.

In example embodiments, the response may comprise vehicle identification information/data configured to identify, at least in part, the vehicle which the vehicle apparatus 20 is on-board. For example, a response may indicate the type, make, model, trim package, year and/or the like of the vehicle associated with the vehicle apparatus 20, a sensor configuration associated with the vehicle apparatus 20, and/or the like. As should be understood, in various embodiments, the response may comprise various information/data identifying the vehicle apparatus 20 and/or the corresponding vehicle such that, if desired, the most preferred map version may be determined for a subset of vehicle apparatuses 20 and/or corresponding vehicles.

In an example embodiment, a response may comprise a short term change indicator. For example, one or more sensors 30 and/or the processor 22 on-board the vehicle may identify a construction sign, sign indicating a festival or road race is occurring, and/or the like indicating that a change to the corresponding roadway (e.g., a lane closure) may be temporary. If the vehicle apparatus 20 detects one or more indications that a temporary situation is occurring corresponding to a link having a changed attribute (e.g., a link that has a link attribute according to Version A that is different from the corresponding link attribute according to Version B), the vehicle apparatus 20 may flag the response with a short term change indicator in order to indicate that a temporary change in the roadway may be occurring.

III. Example Apparatus

The vehicle apparatus 20 and/or update apparatus 10 of an example embodiment may be embodied by or associated with a variety of computing devices including, for example, such as a navigation system including an in-vehicle navigation system, a vehicle control system, a personal navigation system (PND) or a portable navigation device, an advanced driver assistance system (ADAS), a global positioning system (GPS), a cellular telephone, a mobile phone, a personal digital assistant (PDA), a watch, a camera, a computer, and/or other device that can perform navigation-related functions, such as digital routing and map display. Additionally or alternatively, the vehicle apparatus 20 and/or update apparatus 10 may be embodied in other types of computing devices, such as a server, a personal computer, a computer workstation, a laptop computer, a plurality of networked computing devices or the like, that are configured to update one or more map tiles, analyze probe points for route planning or other purposes. In this regard, FIG. 2A depicts an update apparatus 10 and FIG. 2B depicts a vehicle apparatus 20 of an example embodiment that may be embodied by various computing devices including those identified above. As shown, the update apparatus 10 of an example embodiment may include, may be associated with or may otherwise be in communication with a processor 12 and a memory device 14 and optionally a communication interface 16 and/or a user interface 18. Similarly, a vehicle apparatus 20 of an example embodiment may include, may be associated with, or may otherwise be in communication with a processor 22, and a memory device 24, and optionally a communication interface 26, a user interface 28, and/or one or more sensors 30 (e.g., a location sensor such as a GPS sensor; camera(s); 2D and/or 3D LiDAR(s); long, medium, and/or short range RADAR; ultrasonic sensors; electromagnetic sensors; (near-)IR cameras, 3D cameras, 360° cameras, accelerometer(s), gyroscope(s), and/or other sensors that enable the vehicle apparatus to determine one or more features of the corresponding vehicle's surroundings).

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the update apparatus 10 and/or vehicle apparatus 20 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the update apparatus 10 and/or vehicle apparatus 20 may include a user interface 18, 28 that may, in turn, be in communication with the processor 12, 22 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, 24, and/or the like).

The update apparatus 10 and/or the vehicle apparatus 20 may optionally include a communication interface 16, 26. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the update apparatus 10 and/or vehicle apparatus 20 of an example embodiment, a navigation system may also include or have access to a geographic database that includes a variety of data (e.g., map information/data) utilized in constructing a route or navigation path and determining the time to traverse the route or navigation path. For example, a geographic database may include node data records (e.g., including anchor node data records comprising junction identifiers), road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In example embodiments, the update apparatus 10 may be configured to modify, update, and/or the like one or more data records of the geographic database. As should be understood, the map information/data may relate to various modes of transportation (e.g., automobile, public transportation, bus, train, biking, running, walking, etc.) and navigation around various geographic areas (e.g., indoors such as in a mall, in a bounded indoor/outdoor area such as an amusement park, in a generally unbounded outdoor area such as for roadway travel, and/or the like).

In an example embodiment, the road segment data records are links or segments, e.g., maneuvers of a maneuver graph, representing roads, streets, or paths, as can be used in the calculated route or recorded route information for determination of one or more personalized routes. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In example embodiments, the geographic database may be updated based on information/data provided by one or more vehicle apparatuses. For example, the update apparatus 10 may update the geographic database based on a most preferred map version as determined from a plurality of responses received from a plurality of vehicle apparatuses 20, as described elsewhere herein.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies an apparatus 10 in accordance with an example embodiment may determine the time to traverse a route that includes one or more turns at respective intersections more accurately.

IV. Apparatus, Methods, and Computer Program Products

As described above, FIGS. 3 and 4 illustrate flowcharts of apparatuses 10, 20, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contem- That which is claimed:

1. A method comprising:
   receiving at least one change trigger;
   providing two or more versions of a map tile to a plurality of vehicle apparatuses;
   receiving two or more responses from at least two of the plurality of vehicle apparatuses, a response of the two or more responses comprising an indicator of a preferred version of the map tile, the preferred version of the map tile selected by a vehicle apparatus of the plurality of vehicle apparatuses from the two or more versions of the map tile, wherein the preferred version of the map tile is automatically selected by the vehicle apparatus based on analysis of sensor data captured by one or more sensors of the vehicle apparatus, the preferred version of the map tile being the version of the map tile of the two or more versions of the map tile that most closely aligns with the sensor data, the sensor data representing the environment about a vehicle that the vehicle apparatus is located onboard;
   analyzing the responses to determine a most preferred version of the map tile, the most preferred version of the map tile being indicated as the preferred version of the map tile in more of the two or more responses than any other of one or more remaining versions of the map tile of the two or more versions of the map tile; and
   when it is determined that the most preferred version of the map tile is a changed map tile version, updating a map database based at least in part on the changed map tile version.

2. A method according to claim 1 further comprising:
   in response to analyzing the responses, generating a second changed map tile version;
   providing a second two or more versions of the map tile to a second plurality of vehicle apparatuses, the second two or more map versions comprising the second changed map tile version;
   receiving two or more responses from at least two of the second plurality of vehicle apparatuses, a response of the two or more responses comprising an indicator of a preferred version of the map tile, the preferred version of the map tile selected by a vehicle apparatus of the second plurality of vehicle apparatuses from the second two or more versions of the map tile; and
   analyzing the responses to determine a second most preferred version of the map tile.

3. A method according to claim 1 wherein the two or more versions of the map tile differ from each other by one or more link attributes, intersection attributes, and/or point of interest attributes.

4. A method according to claim 1 further comprising generating the changed map tile version by changing one or more link attributes, intersection attributes and/or point of interest attributes of a stable map tile version.

5. A method according to claim 4 wherein the change of the one or more link attributes, intersection attributes, and/or point of interest attributes is based at least in part on the at least one change trigger.

6. A method according to claim 1 wherein a change trigger of the at least one change trigger is a sensor data reporting received from a vehicle apparatus.

7. A method according to claim 1 wherein a response of the plurality of responses includes information that identifies the corresponding vehicle apparatus type.

8. A method according to claim 1 further comprising analyzing the responses to determine if a change indicated by the at least one change trigger is a temporary change or a long term change.

9. A method according to claim 1, wherein the two or more versions of the map tile are provided (a) within one map tile or (b) as two separate map tiles representing a same geographic area.

10. An apparatus comprising at least one processor and at least one memory storing computer program code, the at least one memory and the computer program code configured to, with the processor, cause the apparatus to at least:
    receive at least one change trigger;
    provide two or more versions of a map tile to a plurality of vehicle apparatuses;
    receive two or more responses from at least two of the plurality of vehicle apparatuses, a response of the two or more responses comprising an indicator of a preferred version of the map tile, the preferred version of the map tile selected by a vehicle apparatus of the plurality of vehicle apparatuses from the two or more versions of the map tile, wherein the preferred version of the map tile is automatically selected by the vehicle apparatus based on analysis of sensor data captured by one or more sensors of the vehicle apparatus, the preferred version of the map tile being the version of the map tile of the two or more versions of the map tile that most closely aligns with the sensor data, the sensor data representing the environment about a vehicle that the vehicle apparatus is located onboard;
    analyze the responses to determine a most preferred version of the map tile, the most preferred version of the map tile being indicated as the preferred of the map tile in more of the two or more responses than any other of one or more remaining versions of the map tile of the two or more versions of the map tile; and
    when it is determined that the most preferred version of the map tile is a changed map tile version, update a map database based at least in part on the changed map tile version.

11. An apparatus according to claim 10, wherein the at least one memory and the computer program code are further configured to, with the processor, cause the apparatus to at least:
    in response to analyzing the responses, generate a second changed map tile version;
    provide a second two or more versions of the map tile to a second plurality of vehicle apparatuses, the second two or more versions of the map tile comprising the second changed map tile version;
    receive two or more responses from at least two of the second plurality of vehicle apparatuses, a response of the two or more responses comprising an indicator of a preferred version of the map tile, the preferred version of the map tile selected by a vehicle apparatus of the second plurality of vehicle apparatuses from the second two or more versions of the map tile; and
    analyze the responses to determine a second most preferred version of the map tile.

12. An apparatus according to claim 10 wherein the two or more versions of the map tile differ from each other by one or more link attributes, intersection attributes, and/or point of interest attributes.

13. An apparatus according to claim 10 wherein the at least one memory and the computer program code are further configured to, with the processor, cause the apparatus to at least generate the changed map tile version by changing one or more link attributes, intersection attributes and/or point of interest attributes of a stable map tile version.

14. An apparatus according to claim 13 wherein the change of the one or more link attributes, intersection attributes, and/or point of interest attributes is based at least in part on the at least one change trigger.

15. An apparatus according to claim 10 wherein a change trigger of the at least one change trigger is a sensor data reporting received from a vehicle apparatus.

16. An apparatus according to claim 10 wherein a response of the plurality of responses includes information that identifies the corresponding vehicle apparatus type.

17. An apparatus according to claim 10 wherein the at least one memory and the computer program code are further configured to, with the processor, cause the apparatus to at least analyze the responses to determine if a change indicated by the at least one change trigger is a temporary change or a long term change.

18. An apparatus according to claim 10, wherein the two or more versions of the map tile are provided (a) within one map tile or (b) as two separate map tiles representing a same geographic area.

19. A computer program product comprising at least one non-transitory computer-readable storage medium having computer-executable program code instructions stored therein, the computer-executable program code instructions comprising program code instructions configured to:
receive at least one change trigger;
provide two or more versions of a map tile to a plurality of vehicle apparatuses;
receive two or more responses from at least two of the plurality of vehicle apparatuses, a response of the two or more responses comprising an indicator of a preferred version of the map tile, the preferred version of the map tile selected by a vehicle apparatus of the plurality of vehicle apparatuses from the two or more versions of the map tile, wherein the preferred version of the map tile is automatically selected by the vehicle apparatus based on analysis of sensor data captured by one or more sensors of the vehicle apparatus, the preferred version of the map tile being the version of the map tile of the two or more versions of the map tile that most closely aligns with the sensor data, the sensor data representing the environment about a vehicle that the vehicle apparatus is located onboard;
analyze the responses to determine a most preferred version of the map tile, the most preferred version of the map tile being indicated as the preferred version of the map tile in more of the two or more responses than any other of one or more remaining versions of the map tile of the two or more versions of the map tile, and
when it is determined that the most preferred version of the map tile is a changed map tile version, update a map database based at least in part on the changed map tile version.

20. A computer program product according to claim 19, wherein the two or more versions of the map tile are provided (a) within one map tile or (b) as two separate map tiles representing a same geographic area.

21. An apparatus comprising at least one processor and at least one memory storing computer program code, the apparatus being onboard a vehicle traversing at least a portion of a road network the at least one memory and the computer program code configured to, with the processor, cause the apparatus to at least:
receive two or more versions of a map tile representing part of a road network;
receive sensor data corresponding to a link, intersection, or point of interest in the map tile, the sensor data captured by one or more sensors of the apparatus;
analyze at least a portion of the sensor data;
based at least in part on a result of analyzing the at least a portion of the sensor data, automatically select a preferred version of the map tile from the two or more versions of the map tile, the preferred version of the map tile selected based on the preferred version of the map tile being better aligned with the result than the other of the two or more versions of the map tile; and
provide a response indicating the preferred version of the map tile.

22. An apparatus according to claim 21, wherein the sensor data corresponding to the link, intersection, or point of interest is collected by one or more sensors on-board a vehicle as the vehicle traverses the link, intersection, or vicinity of the point of interest.

23. An apparatus according to claim 21 wherein the two or more versions of the map tile differ from each other by one or more link attributes, intersection attributes, and/or point of interest attributes.

24. An apparatus according to claim 21 wherein the at least one memory and the computer program code are further configured to, with the processor, cause the apparatus to at least:
prior to receiving the two or more versions of the map tile, receive and analyze sensor data;
determine at least one difference between a result of analyzing the sensor data and a corresponding map tile; and
report at least a portion of the sensor data.

* * * * *